(12) United States Patent
Qi

(10) Patent No.: US 8,112,622 B2
(45) Date of Patent: Feb. 7, 2012

(54) CHAINING PORT SCHEME FOR NETWORK SECURITY

(75) Inventor: Zheng Qi, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 967 days.

(21) Appl. No.: 11/635,880

(22) Filed: Dec. 8, 2006

(65) Prior Publication Data

US 2008/0141023 A1   Jun. 12, 2008

(51) Int. Cl.
*H04L 29/06* (2006.01)
*G06F 9/00* (2006.01)
*G06F 15/16* (2006.01)
*G06F 17/00* (2006.01)

(52) U.S. Cl. .......................... 713/153; 713/150; 726/12

(58) Field of Classification Search .................. 713/150, 713/151, 153, 170, 160; 380/257, 261; 726/11, 726/12; 709/230, 236
See application file for complete search history.

(56) References Cited

U.S. PATENT DOCUMENTS

| | | | |
|---|---|---|---|
| 7,082,530 B1 * | 7/2006 | Diamant | 713/153 |
| 7,243,254 B1 | 7/2007 | Kuroodi et al. | |
| 7,370,348 B1 * | 5/2008 | Patel et al. | 726/5 |
| 7,886,143 B2 | 2/2011 | Qi et al. | |
| 2002/0041685 A1 | 4/2002 | McLoone et al. | |
| 2002/0106078 A1 | 8/2002 | Qi et al. | |
| 2002/0136208 A1 | 9/2002 | Skirmont et al. | |
| 2003/0115447 A1 | 6/2003 | Pham et al. | |
| 2003/0133568 A1 | 7/2003 | Stein et al. | |
| 2004/0139313 A1 * | 7/2004 | Buer et al. | 713/150 |
| 2004/0143734 A1 * | 7/2004 | Buer et al. | 713/153 |
| 2004/0193891 A1 | 9/2004 | Ollila | |
| 2005/0094568 A1 * | 5/2005 | Judd | 370/242 |
| 2005/0198531 A1 | 9/2005 | Kaniz et al. | |
| 2006/0015753 A1 | 1/2006 | Drehmel et al. | |
| 2006/0112431 A1 * | 5/2006 | Finn et al. | 726/22 |
| 2006/0136715 A1 * | 6/2006 | Han et al. | 713/151 |
| 2007/0055891 A1 * | 3/2007 | Plotkin et al. | 713/189 |
| 2008/0034197 A1 * | 2/2008 | Engel et al. | 713/150 |
| 2008/0075073 A1 | 3/2008 | Swartz | |
| 2008/0130889 A1 | 6/2008 | Qi et al. | |
| 2008/0130894 A1 | 6/2008 | Qi et al. | |

OTHER PUBLICATIONS

Agnew, G B., et al., "An implementation of elliptic curve cryptosystems over F2155", IEEE Journal on Selected Areas in Communications, vol. 11, No. 5, (Jun. 1993), pp. 804-813.

Bellare, M. et al., "A conventional authenticated-encryption mode", (Apr. 13, 2003),14 pages.

Bellare, M. et al., "Incremental cryptography: the case of hashing and signing", Advances in Cryptology—Proceedings of CRYPTO, Lecture Notes in Computer Science, vol. 839, (Dec. 10, 1995),19 pages.

(Continued)

*Primary Examiner* — Ashok Patel
*Assistant Examiner* — Daniel Potratz
(74) *Attorney, Agent, or Firm* — Brake Hughes Bellermann LLP

(57) ABSTRACT

A networking method, microchip, and device are described in which a first security engine may be associated with a chaining port and configured to perform an inner processing for an inner layer of encryption for a frame of data, while a second security engine may be associated with an external port and configured to perform an outer processing for an outer layer of encryption for the frame of data. Control logic may be configured to instruct the first security engine to execute both a transmit operation and a receive operation of the frame of data in association with the inner processing.

11 Claims, 7 Drawing Sheets

OTHER PUBLICATIONS

Bellare, M. et al., "A Concrete Security Treatment of Symmetric Encryption: Analysis of the DES Modes of Operation", Proceedings of 38th Annual Symposium on Foundations of Computer Science, IEEE, (1997), 32 pages.
Bellare, M. et al., "The security of the cipher block chaining message authentication code", Journal of Computer and System Sciences, vol. 61, No. 3, (Jul. 29, 1999), 36 pages.
Bellare, M. et al., "XOR MACS: New Methods for Message Authentication using Finite Pseudorandom Functions", Advances in Cryptology, Proceedings of 15th Annual International Cryptology Conference, (1995), 21 pages.
Dworkin, M. "Recommendation for Block Cipher Modes of Operation: Methods and Techniques", National Institute of Standards and Technology, NIST Special Publication -800-38B, (2005), 22 pages.
Guajardo, J. et al., "Efficient Algorithms for Elliptic Curve Cryptosystems", Advances in Cryptology, (1997), pp. 342-356.
Halbutogullar, A. et al., "Mastrovito Multiplier for General Irreducible Polynomials", IEEE Transactions on Computers, vol. 49, No. 5, (May 2000), 10 pages.
Hasan, M. A., et al., "Modular construction of low complexity parallel multipliers for a class of finite fields GF(2m)", IEEE Transactions on Computers, vol. 41 No. 8, (Aug. 1992), pp. 962-971.
Housley, R. "Using AES Counter Mode With IPsec ESP <draft-ietf-ipsec-ciph-aes-ctr-00.txt>", IPsec Working Group, Internet Draft, RSA Laboratories, (Jul. 2002),12 pages.
Iwata, T. et al., "OMAC: One-Key CBC MAC", Lecture Notes in Computer Science, vol. 2887, Proceedings of Fast Software Encryption, (Mar. 10, 2003), 26 pages.
Koc, C. K., et al., "Low-Complexity Bit-parallel Canonical and Normal Basis Multipliers for a Class of Finite Fields", IEEE Transactions on Computers, vol. 47, No. 3, (Mar. 1998), 5 pages.
Kohno, T. et al., "The CWC-AES Dual-use Mode", Internet Draft, Crypto Forum Research Group, Webpage available at: http://www.zork.org/cwc/draft-irtf-cfrg-cwc-01.txt.,(May 20, 2003), 22 pages.
Krawczyk, H. "The Order of Encryption and Authentication for Protecting Communications", Lecture Notes in Computer Science; vol. 2139, Proceedings of the 21st Annual International Cryptology Conference on Advances in Cryptology, (2001), 22 pages.
McGrew, D. et al., "Flexible and Efficient Message Authentication in Hardware and Software", (2003), 20 pages.
McGrew, D. A., et al., "The Galois/Counter Mode of Operation (GCM)", (2004), 43 pages.
Orlando, G. et al., "A super-serial Galois fields multiplier for FPGAs and its application to public-key algorithms", in Seventh Annual IEEE Symposium on Field-Programmable Custom Computing Machines, (1999), pp. 232-239.
Paar, C. "A New Architecture for a Parallel Finite Field Multiplier with Low Complexity Based on Composite Fields", IEEE Transactions on Computers, vol. 45, No. 7, (Jul. 1996), 15 pages.
Paar, C. "Implementation Options for Finite Field Arithmetic for Elliptic Curve Cryptosystems", (1999), 31 pages.
Reyhani-Masoleh, A. et al., "Low Complexity Bit Parallel Architectures for Polynomial Basis Multiplication over GF (2m)", IEEE Transactions on Computers, vol. 53, No. 8, (Aug. 2004), pp. 945-959.
Rogaway, P. et al., "OCB: A block-cipher mode of operation for efficient authenticated encryption", ACM Transactions on Information and System Security, vol. 6, No. 3, (Aug. 2003), pp. 1-39.
Romanow, A. "802.1AE—Media Access Control (MAC) Security", Webpage available at: http://www.ieee802.org/1/pages/802.1ae.html, (2006).
Seroussi, G. "Table of Low-Weight Binary Irreducible Polynomials", HP Labs Tech. Report HPL-98-135, (Aug. 1998), 16 pages.
Shoup, V. "On Fast and Provably Secure Message Authentication Based on Universal Hashing", in Advances in Cryptology, (1996), pp. 313-328.
Sunar, B. et al., "Mastrovito Multiplier for All Trinomials", IEEE Transactions on Computers, vol. 48, No. 5, (May 1999), 31 pages.
Whiting, D. et al., "Counter with CBCMAC (CCM)", AES Mode of Operation, Submission to NIST, (2002), 9 pages.
Wu, H. "Bit-Parallel Finite Field Multiplier and Squarer Using Polynomial Basis", IEEE Transactions on Computers, vol. 51, No. 7, (Jul. 2002), pp. 750-758.
Wu, Y. et al., "Scan-Based BIST Fault Diagnosis", IEEE Transactions on Computer-Aided Design of Integrated Circuits and Systems, vol. 18, No. 2, (Feb. 1999), pp. 203-211.
Zhang, T. et al., "Systematic Design of Original and Modified Mastrovito Multipliers for General Irreducible Polynomials", IEEE Transactions on Computers, vol. 50, No. 7, (Jul. 2001), pp. 734-749.
"Draft Standard for Local and Metropolitan Area Networks—Port-based Network Access Control (Revision)", [8021AE] IEEE, P802.1X-2004, 175 pages.
"IEEE Standard for Local and metropolitan area networks: Media Access Control (MAC) Security", IEEE Computer Society, IEEE Std 802.1AE (Aug. 18, 2006), 154 pages.
Diffie, W. et al., "Privacy and Authentication: An Introduction to Cryptography", Proceedings of the IEEE, vol. 67, No. 3, (Mar. 1979), pp. 397-427.
"DES Modes of Operation. Federal Information Processing Standards Publication 81", (Dec. 1980).
Bartee, T C., et al., "Computation with Finite Fields", Information and Computers, vol. 6, (Mar. 1963), pp. 79-98.
Gulliver, T. A., et al., "The Generation of Primitive Polynomials in GF(q) with Independent Roots and their Applications for Power Residue Codes, VLSI Testing and Finite Field Multipliers Using Normal Basis", International Journal of Electronics, vol. 71, No. 4, (Oct. 1991), pp. 559-576.
Paar, C. "Efficient VLSI Architectures for Bit-Parallel Computation in Galois Fields", PhD thesis, Institute for Experimental Mathematics, University of Essen, Germany, (1994).
Song, L. et al., "Low-complexity modified Mastrovito multipliers over finite fields GF(2m)", Proceedings of the IEEE International Symposium on Circuits and Systems, vol. 1, (1999), pp. 508-512.
Mastrovito, E. D., "VLSI Designs for Multiplication over Finite Fields GF(2m)", Lecture Notes in Computer Science; vol. 357, Proceedings of the 6th International Conference, on Applied Algebra, Algebraic Algorithms and Error-Correcting Codes, (1988), pp. 297-309.
Office Action received for U.S. Appl. No. 11/607,747, mailed on Nov. 13, 2009.
Office Action received for U.S. Appl. No. 11/606,492, mailed on Dec. 10, 2009.
"Announcing the Advanced Encryption Standard (AES)", Federal Information Processing Standards Publication 197 (FIPS 197), (Nov. 2001), 51 pages.
"Draft IEEE Standard for Local and Metropolitan Area Networks—Port Based Network Access Control—Revision", IEEE Computer Society, IEEE Draft P802.1X-Rev/D10, (Jul. 16, 2004), 11 pages.
U.S. Appl. No. 11/606,492 Final Office Action mailed Jul. 6, 2010, 33 pages.
U.S. Appl. No. 11/607,747, Final Office Action mailed Jun. 11, 2010, 31 pages.
U.S. Appl. No. 11/607,747 Advisory Action mailed Sep. 15, 2010.
Office Action Response filed for U.S. Appl. No. 11/606,492, filed Sep. 27, 2010, 15 pages.
Office Action Response filed for U.S. Appl. No. 11/606,492, filed Apr. 13, 2010, 14 pages.
Office Action Response filed for U.S. Appl. No. 11/607,747, filed Sep. 7, 2010, 14 pages.
Office Action Response filed for U.S. Appl. No. 11/607,747, filed Mar. 4, 2010, 14 pages.
Notice of Allowance received for U.S. Appl. No. 11/607,747, mailed on Nov. 17, 2010, 12 pages.
U.S. Appl. No. 11/606,492 Notice of Allowance mailed Jun. 24, 2011.

* cited by examiner

CHAINING PORT SCHEME FOR NETWORK SECURITY

TECHNICAL FIELD

This description relates to network security.

BACKGROUND

Computer networks, such as those that are compliant with the IEEE 802® suite of protocols, may be deployed in many different settings. For example, local area networks (LANs), including Ethernet networks, may be deployed within a corporate, campus, or home environment. Multiple LANs may be joined into one or more metropolitan area networks (MANs). Due to the wide range of deployment conditions and settings of such networks, it may be difficult or impossible to prevent unauthorized access (or attempts at access) thereto. Consequently, attempts have been made to protect the data and resources of such networks. For example, attempts have been made to maintain confidentiality of transmitted data, and to prevent unauthorized data (e.g., from unauthorized devices) from propagating on the network(s).

For example, protocols associated with the suite of IEEE 802.1® protocols have been developed to circumvent malicious attacks, theft of information, and other unauthorized network uses. For example, the IEEE 802.1AE standard, also known as MACSec, has been developed. MACSec may thus be used, for example, to identify unauthorized devices on a LAN, and/or to prevent propagation of data from such devices. MACSec uses cryptography techniques, such as exchange of cryptographic keys and associated encryption/decryption and authentication techniques, to provide network security at Layer 2 (the link layer) of the Open Systems Interconnection (OSI) model.

MACSec or other security techniques may be implemented within one or more networking chips of a network switch or other network device. However, the user of a networking chip may desire to prevent a network provider from accessing information in a frame sent across the network. Therefore, it may be desirable to develop encryption or authentication schemes to prevent unauthorized access to the frame.

When a frame is sent through multiple networks and/or multiple MACSec providers or users, it may occur that MACSec (or other suitable security protocol) is implemented two or more times for the same frame (or stream of frames). Such techniques may be referred to as double-layer encryption techniques, e.g., as double layer MACSec. For example, the MACSec standard refers to an example scenario in which an Ethernet frame is protected by a double-layer MACSec scheme between two end points defined be two user networks, when the Ethernet frame is tunneled through a provider network that applies its own MACSec implementation. However, due to the manner in which frames are processed and forwarded in a flow-through fashion and at line-speed through network devices, such as switches, it may be difficult to provide such double layer protection in an efficient and cost-effective manner.

SUMMARY

According to one general aspect, a first security engine may be associated with a chaining port and configured to perform an inner processing for an inner layer of encryption for a frame of data, while a second security engine may be associated with an external port and configured to perform an outer processing for an outer layer of encryption for the frame of data. Control logic may be configured to instruct the first security engine to execute both a transmit operation and a receive operation of the frame of data in association with the inner processing.

According to another general aspect, a method includes providing a first security engine associated with a chaining port and configured to perform an inner processing for an inner layer of encryption for a frame of data, providing a second security engine associated with an external port and configured to perform an outer processing for an outer layer of encryption for the frame of data, and providing control logic configured to instruct the first security engine to execute both a transmit operation and a receive operation of the frame of data in association with the inner processing.

According to another general aspect, a network device includes a chaining port associated with a first security engine that is configured to transmit and receive a frame of data and to process an inner layer of encryption of the frame in association with at least one of the transmit and the receive, and an external port associated with a second security engine that is configured to receive the frame of data and process an outer layer of encryption of the frame.

The details of one or more implementations are set forth in the accompanying drawings and the description below. Other features will be apparent from the description and drawings, and from the claims.

DETAILED DESCRIPTION

Figure 1:
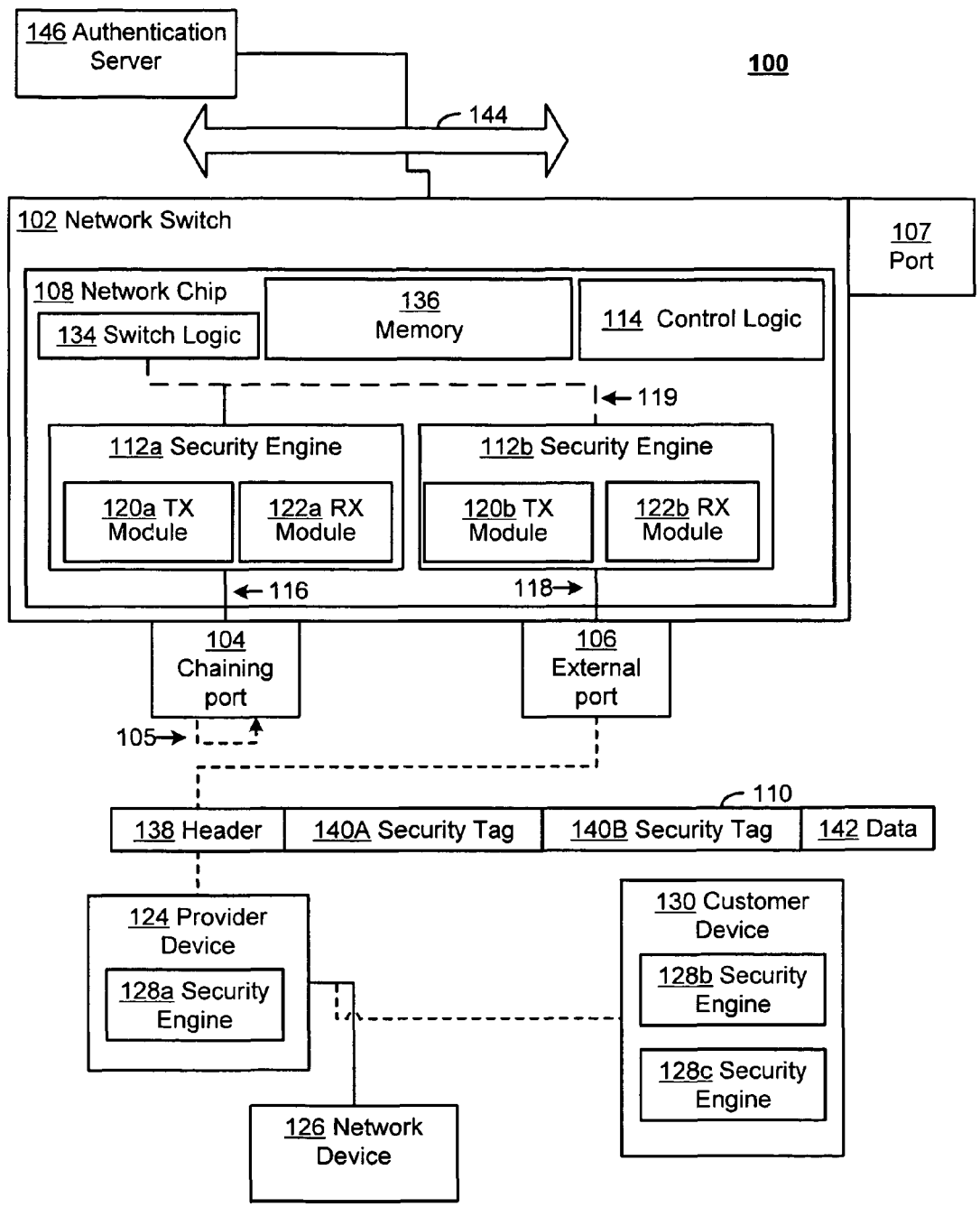
FIG. 1 is a block diagram of a network including a network switch providing double layer security techniques.

FIG. 1 is a block diagram of a network 100 including a network switch 102 providing double layer security techniques. In the example of FIG. 1, the network switch 102 provides switching for the network 100, and may be configured to include an architecture that provides double layer network security for data that are received or transmitted in a manner that is flexible, space-efficient, production-efficient, and cost efficient, and that provides a high level of performance. Thus, the network switch 102 is capable of processing multiple layers or instances of, for example, the MACSec security protocol, for each frame of a stream of data. In this way, for example, a plurality of MACSec providers and/or users may benefit from using their own respective implementations of MACSec for the same datastream(s).

In the example embodiment of FIG. 1, the network 100 may include, for example, a local area network (LAN) or metropolitan area network (MAN), and may implement the Ethernet protocol to provide network access to many different users, each of whom may have varying levels of permission or access to view or manipulate network data. The network 100 may be implemented, for example, for a corporation or other business at one or more physical locations thereof. The network 100 also may represent a network providing service to a plurality of consumers at their respective houses or other locations. Of course, these are but a few, non-limiting examples of types of networks represented by the network 100, and many other examples of networks that are interoperable with, or make use of, the network switch 102, may be used as well.

In the example of FIG. 1, the network 100 may represent one or more networks that are in communication with one another, or with other networks. For example, the network 100 may include a customer network implemented by an enterprise, consumer, organization, or other entity, and may exchange communications with, or through, some other network that is external to this entity. For example, the network 100 may communicate with, for example, a provider network that is maintained by a network service provider of the entity, and/or may communicate with another customer network, perhaps by way of the provider network. Consequently, it may occur that an administrator of the network 100 may wish to execute a first implementation of a network security protocol with the provider network and may wish to execute a second, separate implementation of the same network security protocol with the other customer network. More detailed examples of such network scenarios are described in more detail, below, with respect to FIG. 2.

In order to execute both implementations or instances of the network security protocol, such as MACSec, the network switch 102 includes a chaining port 104 and an external port 106. As described in more detail below, the chaining port 104 may be configured to perform both a transmit and a receive operation for each frame of a stream of data (e.g., may perform a transmit operation for each frame and then "loop-back" the same frame for a corresponding receive operation, as illustrated by a connection 105 and as described in more detail, below). The chaining port 104 may thereby provide an opportunity for the network switch 102 to implement both implementations, or layers, of a network security protocol. More specifically, the chaining port 104, in the configuration just mentioned and in conjunction with the external port 106, provides the network switch 102 with an opportunity to execute a first implementation of MACSec associated with the network 100 and a first external network/device, and to execute a second implementation of MACSec associated with the network 100 and a second external network/device.

In this regard, it will be appreciated that the chaining port 104 and the external port 106 represent two ports of the network switch 102, which may have, in actuality, 12, 24, 48, or more ports. In the implementation of FIG. 1 and related implementations, virtually any pair, or plurality of pairs, of the available ports may be configured to act as a chaining port/external port pair. That is, some, all, or none of the total available ports may be configured into pairs of instances of the chaining port 104 and the external port 106, so that the network switch 102 with such a plurality of ports provides a configurable, scalable architecture for supporting multiple instances of the double-layer security protocol(s) described herein, e.g., for multiple networks, such as provider networks.

In this regard, the external port 106 represents a port that is in communication with one or more of the external networks referenced above. Together, as just mentioned, the chaining port 104 and the external port 106 allow the network switch 102 to execute the double-layer network security techniques referenced above, and as described in more detail below.

In the example embodiment shown in FIG. 1, the network switch 102 further includes a network chip 108 configured to support and enable operations of the network switch 102. The network chip 108, for example, provides a designer, manufacturer, or producer of the network switch 102 with the ability to configure the network switch 102 to provide double-layer network security for a desired number, combination, and/or configuration of available networks and/or entities. For example, although not specifically illustrated in FIG. 1, it will be appreciated that the network chip 108 may be associated with a host management interface (HMI) or local management interface (LMI) that is capable of setting control registers or other control elements of the network chip 108 as part of, for example, an effort to configure a port of the network switch 102 as the chaining port 104 (or, conversely, to re-configure the chaining port 104 into a standard port if double layer security techniques are not currently needed).

The network chip 108 receives, processes, and/or transmits a frame 110 of data. Of course, the frame 110 is illustrated as a singular frame, but it will be appreciated that the network switch 102 is configured to process a stream of data that includes a number of instances of the frame(s) 110.

In order to implement the double-layer network security schemes described herein, the network chip 108 shown in FIG. 1 includes a first security engine 112*a* associated with the chaining port 104, a second security engine 112*b* associated with the external port 106, and control logic 114. The security engines 112*a*, 112*b* may represent, for example, MACSec-compliant security engines that are configured to perform cryptographic processing on the frame 110, the cryptographic processing associated with, for example, encryption, decryption, authentication, or other security-related measures taken with respect to the frame 110.

The control logic 114 may include instructions for the first and second security engines 112*a*, 112*b* regarding, for example, transmit and receive operations for the frame 110. The control logic 114 also may be used, as just referenced, as part of the functionality of configuring the chaining port 104 as such, i.e., as implementing the "loop-back" functionality described herein in which both a transmit and a receive operation are performed on the frame 110, so that the double-layer network security schemes may be implemented.

First and second data paths 116, 118 illustrate links or channels between the first and second security engines 112*a*, 112*b*, and the chaining port 104 and the external port 106, respectively. Meanwhile, a data path 119 represents a link or channel between the first security engine 112*a* and the second security engine 112*b*. Of course, the data paths 116, 118, and 119 are merely intended as representative of a plurality of data paths that may be used to provide line-speed processing of the frame 110.

As referenced above, the chaining port 104 may be configured to perform a loopback function in association with the first security engine 112*a*, as shown by the connection 105. One example of the loopback function may be an external loopback function, including, in some example implementations, an external, physical connection (e.g., a wire), or, in other implementations, including an internal path for the connection 105. In such a loopback function, as referenced above, the chaining port 104 executes both a transmit operation and a receive operation on the frame 110 of data. For example, the first security engine 112*a* may transmit the frame 110 through the chaining port 104, through the connection 105, to be received back into the chaining port 104.

The first and second security engines 112*a*, 112*b* may be in communication with each other, e.g., by way of the data path 119, and may each perform processing operations on the frame 110. These processing operations may include, for example, encrypting or decrypting the frame 110 of data, authenticating the frame 110, or otherwise providing network security for the frame 110.

As shown, the first and second security engines 112a, 112b may each include a transmit module 120a, 120b and a receive module 122a, 122b. The transmit modules 120a, 120b and the receive modules 122a, 122b may enable the first and second security engines 112a, 112b to transmit, process, and/or receive the frame 110 of data, as would be apparent. The term "processing" may be used, for example, to refer to one or more aspects of an encryption/decryption operation or exchange performed on a frame of data, such as the frame 110. Also, although authentication and encryption/decryption of user data may be performed separately or together, it will be appreciated that authentication or any other security-related technique also may be part of a cryptographic processing of a frame of data.

In the example embodiment shown in FIG. 1, and as referenced above, the network switch 102 may transmit or receive data such as the frame 110 from a provider device 124, such as by way of the external port 106. The external port 106 may transmit and receive the frame 110 to and from other devices in the network 100, or to and from other networks, as referenced above. For example, the external port 106 may send the frame 110 to the provider device 124 which may be associated with a network device 126, where the provider device 124 includes its own security engine 128a. The provider device 124 may, in turn, transmit or receive the frame 110 to or from a customer device 130, which includes one or more security engines 128b, 128c. Although ostensibly illustrated as part of the network 100 in the example of FIG. 1, it will be appreciated that the provider device 124, the network device 126, and the customer device 130, all may be part of, or may be communicated by way of, one or more other networks, as described below with respect to FIG. 2.

In the example embodiment shown in FIG. 1, the network chip 108 may further include a switch logic 134 and a memory 136. The switch logic 134 may be configured to direct network traffic between ports of the network switch 102, such as between the chaining port 104 and the external port 106, or another port, such as a port 107 (shown generically in FIG. 1 as not being associated with a separate security engine, although such a security engine may be provided if necessary or desired). For example, the switch logic 134 may determine that data received by the network chip 110 (e.g., through the port 107) should be sent to the security engine 112a of the chaining port 104. The data may be decrypted/authenticated and forwarded to the chaining port 104, where it is sent and received over the connection 105 and then forwarded over the connection 119 to the security engine 112b, whereupon a second layer of decryption/authentication may occur before subsequent, further forwarding of the data. Or, the switch logic 134 may determine that data received from the external port 106 should be directed through the security engine 112b, the chaining port 104, the security engine 112a, and, ultimately, forwarded through the port 107. In these ways, as described in more detail, below, the network switch 102 may implement the double layer security schemes described herein, using both of the security engines 112a, 112b and both of the chaining port 104 and the external port 106 (and perhaps other ports, represented by the port 107).

In routing the data between ports, or otherwise processing the data, the switch logic 134 may consult the memory 136. The memory 136 may include, for example, various known types of registers, read only memory (ROM), random access memory (RAM), flash memory, or virtually any appropriate memory type, or combinations thereof. The memory 136 is illustrated on the network chip 108 in FIG. 1, but it should be apparent that some or all of the memory 136 may be available on the network switch 102 and off of the network chip 108 (e.g., in a separate chip, not shown). There are various known trade-offs related to where and how to construct the memory 136, since, for example, putting the memory 136 on the network chip 108 provides for faster and easier access, but also consumes valuable space on the network chip 108 that may be used for other purposes. Consequently, various known compromises exist and may be implemented, such as, for example, an on-chip cache memory complemented by an off-chip memory. Further, the memory 136 may include firmware, which generally represents stored code or settings that may be defined and stored during an initial configuration, design, or setup for the network chip 110, and that then may be automatically implemented thereafter.

In implementing the double layer security techniques described herein, the first security engine 112a and the second security engine 112b may, in association with the chaining port 104 and the external port 106, respectively perform an inner processing for an inner layer of encryption and an outer processing for an outer layer of encryption for the frame 110 of data. For example, the frame 110 may include a header 138, an outer security tag 140A, an inner security tag 140B, and data (payload) 142. In this example, then, the outer security tag 140A may be considered to represent an outer layer of encryption, while the inner security tag 140B may be considered to represent an inner layer of encryption. Examples and details regarding the security tags 140A, 140B are provided in more detail below, e.g., with respect to FIGS. 4-7. Generally speaking, however, it will be appreciated that the security tags 140A, 140B may include information that allows the security engine(s) 112a, 112b to determine and retrieve appropriate cryptographic keys for use in authenticating (and/or encrypting/decrypting) the data 142.

The inner and outer processing may be illustrated by a first example in which the network switch 102 receives the frame 110 of data, e.g., through the external port 106. The second security engine 112b in this example may be configured to authenticate/decrypt the frame 110 by determining and applying a cryptographic key associated with the outer security tag 140A of the frame 110. Meanwhile, the first security engine 112a may be configured to further authenticate/decrypt the frame 110 by determining and applying a cryptographic key associated with the inner security tag 140B of the frame 110. In this example, then, the transmitter module 120a of the security engine 112a may be configured not to perform cryptographic processing (e.g., not to add an security tag) when sending the frame 110 out through the connection 105, since such an action would merely add back a layer of encryption that was just removed by the second security engine 112b. Nonetheless, the receive module 122a may be configured to perform decryption (e.g., including removal of the inner security tag 140B) according to normal decryption/authentication techniques. In this way, the frame 110 may have both of its layers of encryption (e.g., the security tag(s) 140A, 140B removed upon ingress to the network switch 102, and may thereafter be forwarded to the switch logic 134, as needed, for later forwarding over ports of the network switch 102. Although further details are provided below, it will be appreciated that in this way, the network switch 102 may be configured to implement double layer security techniques, where each layer is associated with a separate provider/user of the associated network security protocols.

Similarly, but conversely, implementations of a second example may include examples in which the switch logic 134 seeks to output data from the external port 106 to some receiving device that implements a shared network security protocol, where an intermediate (e.g., provider) device(s) provides an independent layer (e.g., the outer layer) of network security techniques. For example, the switch logic 134 may seek to transmit the frame 110 (which may be output by the switch logic 134 having no security tags 140A, 140B) by first forwarding the frame 110 through the first security engine 112a and through the chaining port 104 to receive the inner processing for the inner layer of encryption (e.g., the inner security tag 140B), and then forwarding the once-encrypted frame 110 through the security engine 112b and through the external port 106 to receive the outer processing for the outer layer of encryption (e.g., the outer security tag 140A), and then forwarding the twice-encrypted frame 110 out through the external port 106. In this example, in which the switch logic 134 seeks to output the frame 110 from the external port 106, e.g., to the customer device 130 by way of the provider device 124, the receive module 122a may be prevented from, or may be instructed not to, decrypt (e.g., remove the inner security tag 140B from) the once-encrypted frame 110, since such decryption would be counter-productive to the immediately-previous (encryption) efforts of the transmitter module 120a.

The network 100 may implement various types of authentication protocols that attempt to establish an identity and/or permission-level of a user, e.g., when the user signs on to the network 100. For example, the network may utilize a shared media 144. The network 100 may represent an Ethernet passive optical network (EPON), in which case the shared media 144 may include a fiber optic cable. Many other examples of the shared media 144 may be used that provide network access as described herein, including, for example, standard Ethernet cables/wiring.

As shown in FIG. 1, the shared media 144 may provide a connection to an authentication server 146. When a device wishes to join the network 100, such as when a new user connects a local computer, the authentication server 146 may be used to authenticate that user, so as to ensure that only recognized users are granted access. For example, the IEEE® 802.X standard may be used, in which case the network switch 102 initially passes only authentication frames (or authentication-related frame portions) to the authentication server 146. Then, the authentication server 146 may compare the authentication frames to stored user-access information, and grant access accordingly. If access is granted, then the connecting device may be granted access to the network 100.

Such authentication may provide suitable network security in some situations; however, using only this technique may leave the network 100 vulnerable in other situations. For example, the connecting device may include a computer that plugs into the network 100 and is authenticated. Then, a separate device may include a Voice Over Internet Protocol (VoIP) phone that may be plugged into the provider device 124 to thereby obtain access to the network 100, without having been authenticated itself. Consequently, the non-authenticated device may cause damage to, or be used to perform theft of, network operations.

In order to provide additional network security, and as referenced above, the IEEE® 802.1AE protocol has been developed, also known as MACSec. MACSec may be used to provide on-going encryption and authentication of network traffic, beyond the initial authentication just discussed. For example, MACSec may be used to provide symmetric cryptographic key-based security between, for example, the provider device 124 and the customer device 130 and the network switch 102, e.g., using the 802.1AF framework. It will be appreciated that a general operation of MACSec is well-known, and that MACSec includes many features and functions that may not be discussed explicitly herein. Moreover, MACSec, and the variations discussed herein, merely provide examples of the type of security protocol(s) which may be used by various example implementations described herein, and other examples may be used.

In the example of FIG. 1, the provider device 124 and customer device 130 include security engines 128a, 128b, 128c, which may represent MACSec-compliant security engines. The security engine 128a of the provider device 124 may be provided with a symmetric key corresponding to the outer layer of encryption processed by the second security engine 112b. The security engines 128b, 128c of the customer device 130 may be provided with symmetric keys corresponding to both the inner layer of encryption and the outer layer of encryption processed by the first and second security engines 112a, 112b of the network switch 102.

The correspondence between the symmetric keys of the security engines 128b, 128c, and the inner and outer layers of encryption processed by the first and second security engines 112a, 112b may rely on a Security Association (SA) between the security engines 112a, 112b, and the security engines 128b, 128c. According to an example SA, cryptographic keys such as security association keys are predetermined and agreed to by the engines in question. Thus, according to one example embodiment, the security engine 128a of the provider device 124 may be equipped to decrypt the outer layer of encryption, but not the inner layer of encryption, of the frame 110 of data.

Figure 2:
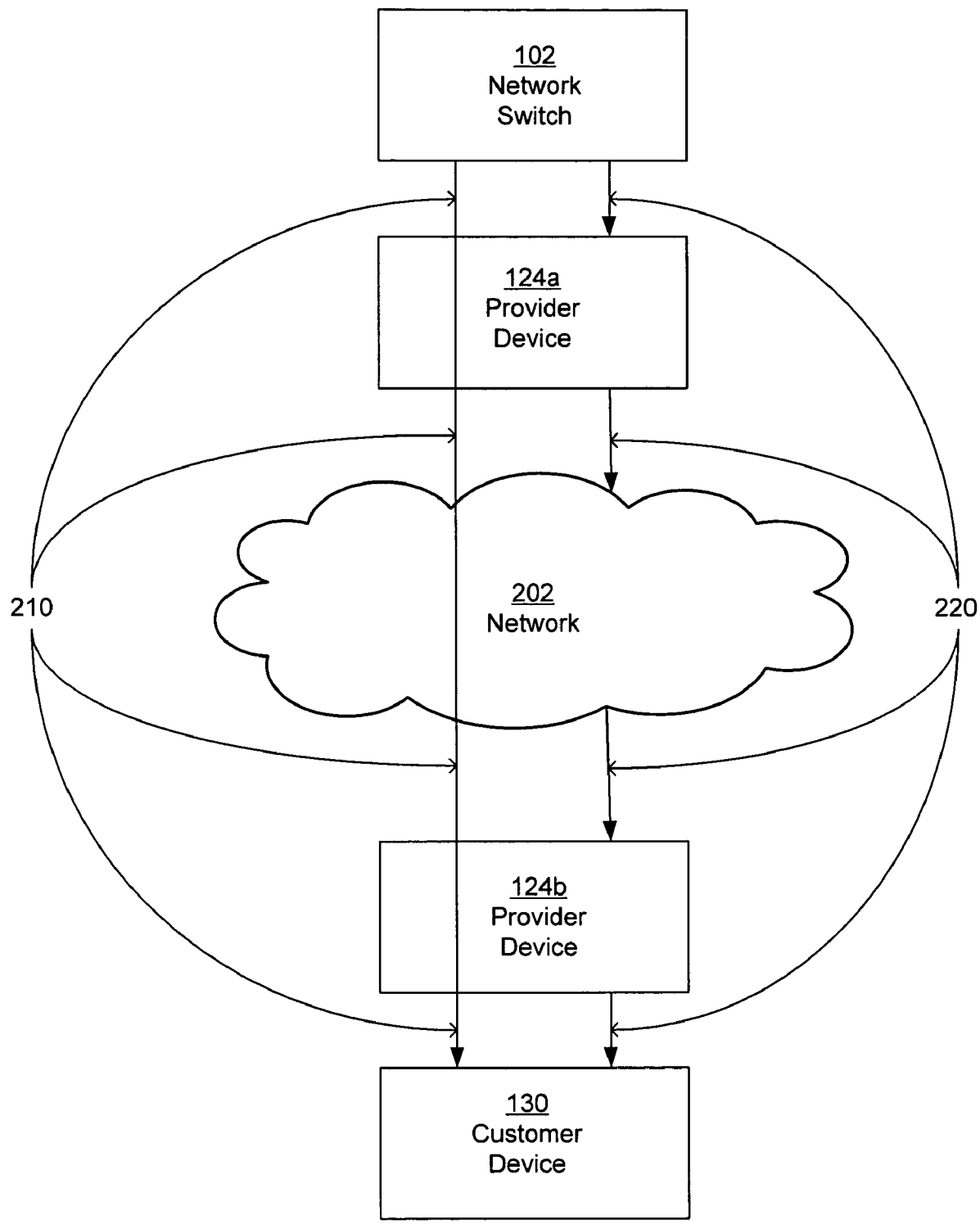
FIG. 2 is a block diagram of network paths that may require the double layer security techniques of FIG. 1.

FIG. 2 is a block diagram illustrating respective paths of an inner layer of encryption and an outer layer of encryption of a frame 110 of data. In this example, the frame 110 travels from the network switch 102, through a first provider device 124a, through the network 202, and through a second provider device 124b, to its destination, the customer device 130. In the example shown in FIG. 2, the frame 110 has been processed by the network switch 102 to include an inner layer of encryption 210 and an outer layer of encryption 220, as discussed above. The outer layer(s) of encryption may be associated with the provider device 124a and/or the provider device 124b. Meanwhile, the inner layer(s) of encryption may be associated just with the network switch 102 and the customer device 130. In other words, outer layer(s) of encryption may be used to obtain hop-by-hop or point-to-point security between provider devices implementing a first instance of a network security protocol (e.g., MACSec), while inner layer (s) of encryption may be used to obtain end-to-end security between customer devices implementing a second instance of the network security protocol.

For example, the provider devices 124a, 124b may hold a cryptographic key(s) associated with the outer layer of encryption 220, but not the inner layer of encryption 210. Thus, when the frame 110 is transmitted from the network switch 102 (as described below in detail with respect to FIGS. 4 and 5) and reaches any of the provider devices 124a, 124b, the outer layer of encryption 220 may be decrypted by the security engine 128a (not shown in FIG. 2) associated with the provider devices 124a, 124b, as shown by the discontinuous lines between the network switch 102 and the customer device 130. After decrypting and thereby removing the outer layer of encryption 220, for example, the provider device 124a may re-encrypt the outer layer of encryption 220 and send the frame to the next provider device 124b.

Were it not for the added level of security enabled by the inner layer of encryption 210, any or all of the provider devices 124a, 124b or the network device would have access to the data 142 contained in the frame 110. However, because none of the provider devices 124*a*, 124*b* or the network device 126 in this example holds a key associated with the inner layer of encryption 210 of the frame 110, the inner layer of encryption 210 remains unaltered, as shown by the continuous (end-to-end) line between the network switch 102 and the customer device 130. The inner layer of encryption 210 prevents the provider devices 124*a*, 124*b* from accessing the data 142 contained in the frame 110. Thus, customer confidentiality/authenticity may be maintained, while providers may continue to switch data using their own security techniques/instances.

The customer device 130 may thus receive the frame 110 with the inner layer of encryption 210 intact, and the outer layer of encryption 220 either intact or re-encrypted, and therefore having both the inner layer of encryption 210 and the outer layer of encryption 220. The customer device 130, which may include security engines 128*b*, 128*c* holding keys with security associations to corresponding security engines of the provider device(s) 124*a*/124*b* and/or the network switch 102, may then process the outer layer of encryption 220 and the inner layer of encryption 210 including decrypting the outer layer of encryption 220 and the inner layer of encryption 220. This processing may be performed according to the example method(s) described herein, e.g., with respect to FIGS. 6-7.

Figure 3:
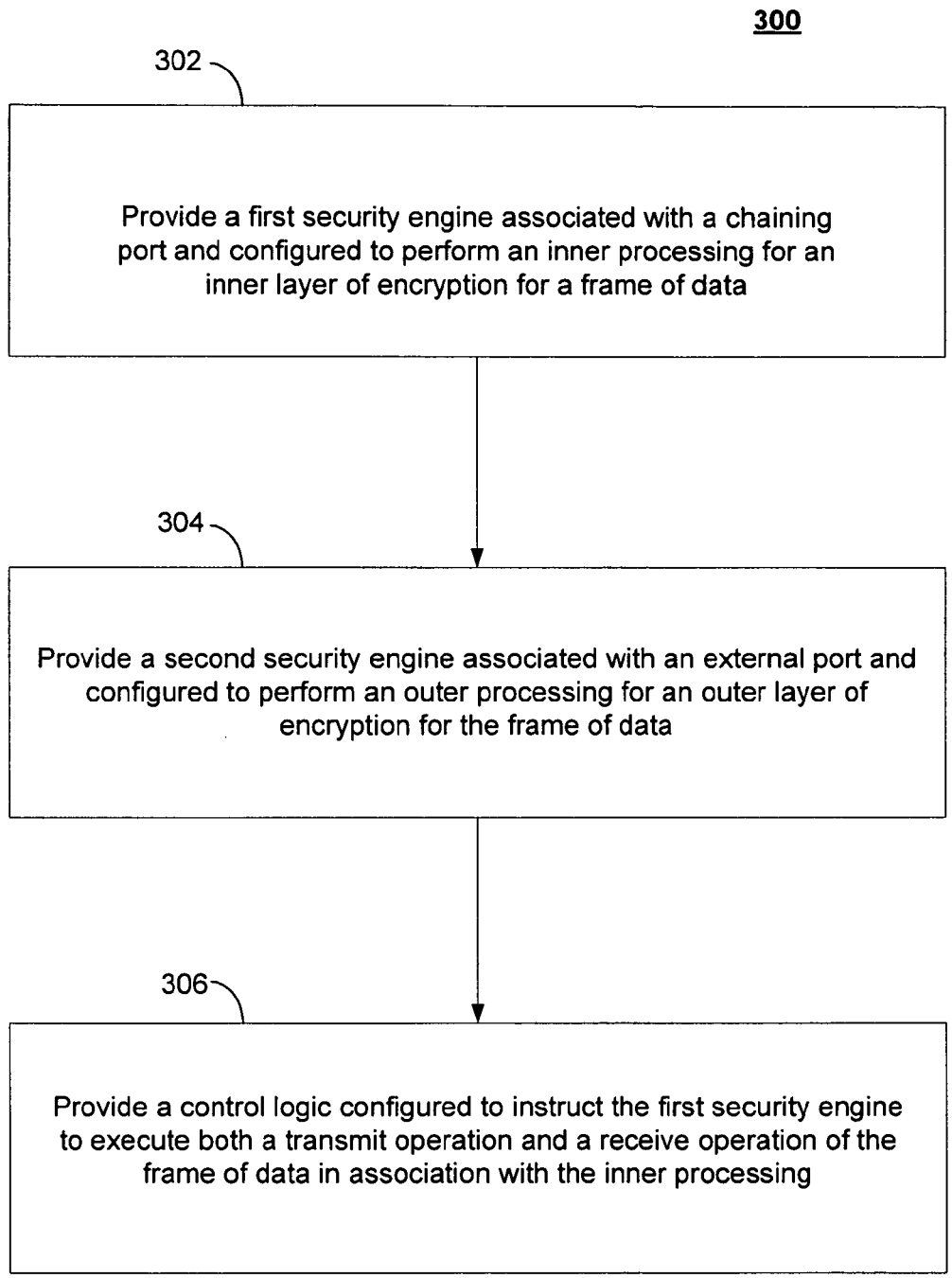
FIG. 3 is a flowchart illustrating a method according to an example embodiment of the network of FIG. 1.

FIG. 3 is a flowchart 300 illustrating a method according to an example embodiment. In FIG. 3, a first security engine 112*a* is provided (302). In the example shown in FIG. 3, the first security engine 112*a* is provided and associated with the chaining port 104, and is configured to perform an inner processing for an inner layer of encryption 210 for a frame 110 of data. The inner processing may occur either during transmission of the frame 110 out of the external port 106 (see, e.g., FIGS. 4-5), or during reception of the frame 110 through the external port 106 (see, e.g., FIGS. 6-7).

Also according to FIG. 3, a second security engine 112*b* is provided (304). The second security engine 112*b* is associated with an external port 106 and configured to perform an outer processing for an outer layer of encryption 220 for the frame 110 of data. Again, the outer processing may occur either during transmission of the frame 110 out of the external port 106 (see, e.g., FIGS. 4-5), or during reception of the frame 110 through the external port 106 (see, e.g., FIGS. 6-7).

Also according to FIG. 3, a control logic 114 is provided (306). The control logic 114 is configured to instruct the first security engine 112*a* to execute both a transmit operation and a receive operation of the frame 110 of data in association with the inner processing (e.g., using the connection 105). The control logic 114 also may provide communication between the first security engine 112*a* and the second security engine 112*b* (e.g., using the data path 119).

Thus, for example, the second security engine 112*b* may be configured (e.g., by default) to route the frame 110 of data, when received from the external port 106, to the first security engine 112*a*, after removal of an outer security tag 140A therefrom. The control logic 114 may be configured to cause the first security engine 112*a* to transmit the now once-encrypted frame 110, using the transmitter module 120*a*, through the loop-back connection 105, without performing the normal encryption functions of the transmitter module 120*a* (e.g., without encrypting the outgoing frame 110 and arriving back as a twice-encrypted layer). Instead, the receiver module 122*a* may perform the inner processing for the inner encryption layer, e.g., by removing the inner security tag 140B and forwarding to the switch logic 134.

A similar but converse example applies when the network switch 102 transmits from the external port 106. That is, the unencrypted frame 110 may be sent to the first security engine 112*a*, encrypted by the transmitter module 120*a*, sent through the connection 105 (without being decrypted upon receipt at the receiver module 122*a*), forwarded over the connection 119 as a once-encrypted frame to the second security engine 112*b*, encrypted with the second layer of encryption (e.g., has the outer security tag 140A added), and sent from the external port 106.

FIG. 3 is illustrated as a sequential order of individual operations; however, it will be appreciated that this is merely for clarity and simplicity of explanation, and that the operations of FIG. 3 may occur any number of times, and in any appropriate order or sequence, and may be supplemented as necessary with desired details not illustrated in FIG. 3.

Figure 4:
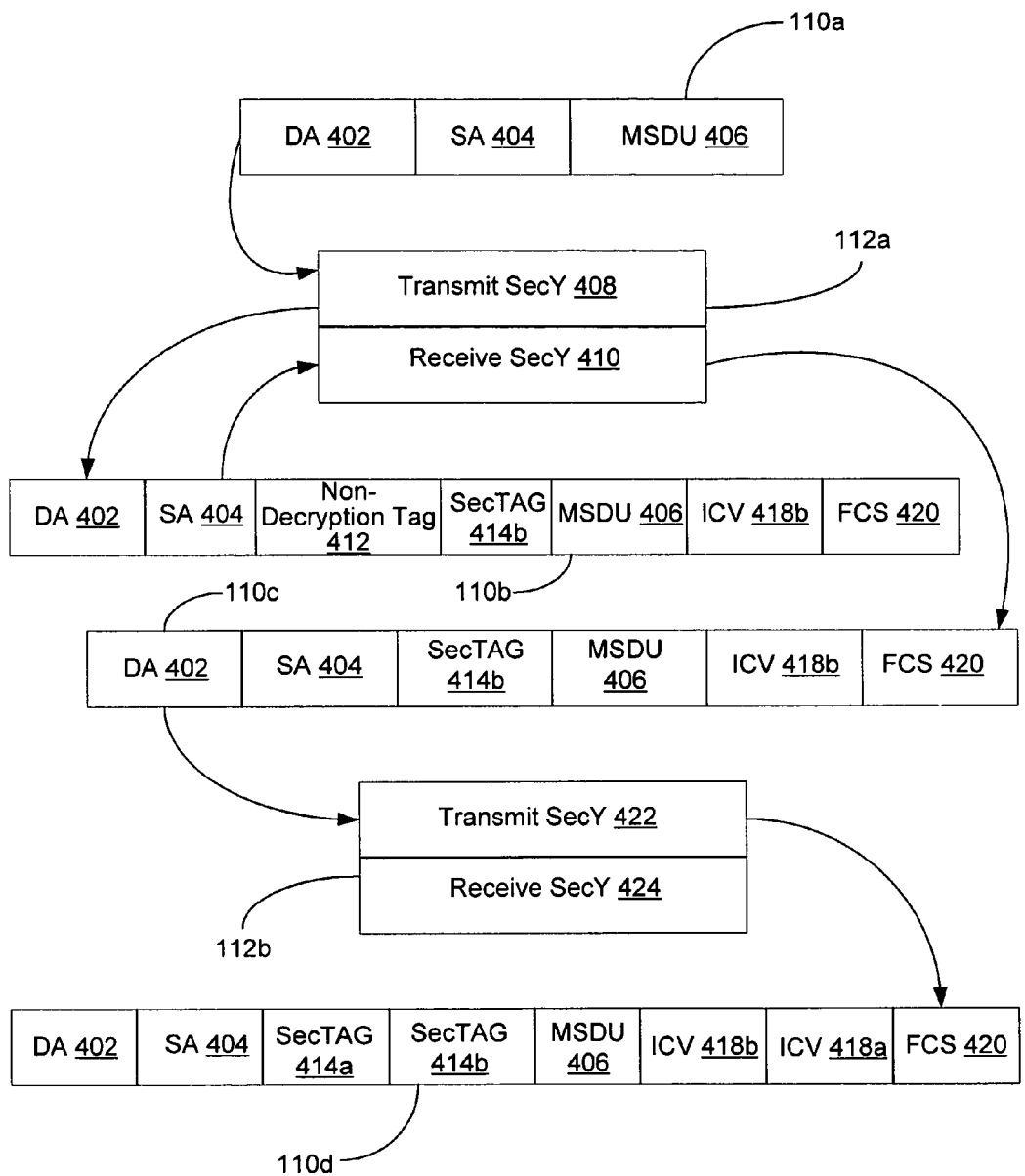
FIG. 4 is a block diagram illustrating stages of a frame of data exiting the network switch of FIG. 1.

FIG. 4 is a block diagram illustrating stages of the frame 110 as it exits the network switch 102 through the chaining port 104 and the external port 106. In the example embodiment of FIG. 4, the frame 110 is subject to the MAC Security Protocol (MACSec); thus, both the inner layer of encryption and the outer layer of encryption include MACSec layers. As shown in FIG. 4, at the initial stage of the egress, the frame 110*a* includes a destination address 402 indicating the intended destination of the frame 110, a source address 404 indicating a source of the frame 110, and a user data 406 (known as MAC Service Data Unit (MSDU) in MACSec parlance) which includes the actual data intended to be transmitted by the frame 110*a*. The frame 110*a* is transmitted through the chaining port 104 by the first security engine 112*a*, which in this example, includes a transmit MAC Security Entity (transmit SecY) 408 and a receive SecY 410, which correspond respectively to the transmitter module 120*a* and the receive module 122*a* of FIG. 1. The chaining port 104 may be configured to perform the external loopback function discussed above, or a similar loopback function.

As the frame 110*a* is transmitted through the chaining port 104 from the first security engine 112*a*, the transmit SecY 408 may insert a non-decryption tag 412, an inner SecTAG 414*b* (which includes, or is associated with, the inner security tag 140B), an inner integrity check value (ICV) 418*b*, and a frame check sequence (FCS) 420. The transmit SecY 408 also may process an inner layer of encryption of the frame 110*a* by encrypting the frame 110*a*. In this example, the inner layer of encryption is a MACSec layer.

The non-decryption tag 412 is used to instruct the first security engine 112*a* not to decrypt the frame 110*b* during the receive portion of the external loopback function illustrated in FIG. 4. In other example implementations, the chaining port 104 may be configured by default not to decrypt the frame 110*b*, in which case the non-decryption tag 412 may not be necessary.

The inner SecTAG 414*a* in the example shown in FIG. 4 may be used, for example, for both authentication and decryption of the frame 110. After recognizing a SecTAG, a receiving module will typically look for a corresponding integrity check value. An integrity check value is a value that is computed by the originator over the entire data value that is to be protected. This integrity check value is then sent with the user data 406 that has been encrypted. Using the same algorithm, an integrity check value is computed by the recipient over the received data value. The receiver compares the received integrity check value with the computed integrity check value. If they match, it is cryptographically guaranteed that the protected data value has not been modified. The frame check sequence 420 typically includes a four-byte cyclic redundancy code, and is used to check the integrity of the frame 110 on the receiving end. The receiving end computes a cyclic redundancy code value over the received frame 110 and compares the computed value with the cyclic redundancy code at the end of the frame 110. If the values do not match, then the frame 110 may be considered damaged.

The frame 110b transmitted by the first security engine 112a through the chaining port 104 is then received by the first security engine 112a, also through the chaining port 104. In the egress example shown in FIG. 4, the receive SecY 410 of the chaining port 104 recognizes the non-decryption tag 412 and, without decrypting the frame 110, removes the non-decryption tag 412 and forwards the frame 110c, which no longer has the non-decryption tag 412, to the second security engine 112b associated with the external port 106.

The second security engine 112b, like the first security engine 112a, includes a transmit SecY 422 and a receive SecY 424. In this egress example where the frame 110c has been forwarded to the second security engine 112b from the first security engine 112a, the second security engine 112b uses the transmit SecY 422 to transmit the frame 110c through the external port 106. In transmitting the frame 110c, the transmit SecY 422 performs an outer processing for an outer layer of encryption of the frame 110c by adding an outer layer of encryption to the frame 110c, inserting an outer SecTag 414a (which includes or is associated with a second security tag), and inserting an outer integrity check value 418a. In this example, the outer layer of encryption is a MACSec layer. At this point, the frame 110d has an inner layer of encryption and an outer layer of encryption, and includes a destination address 402, a source address 404, an outer SecTAG 414a, an inner SecTAG 414b, a user data 406, an inner integrity check value 418b, an outer integrity check value 418a, and a frame check sequence 420.

Figure 5:
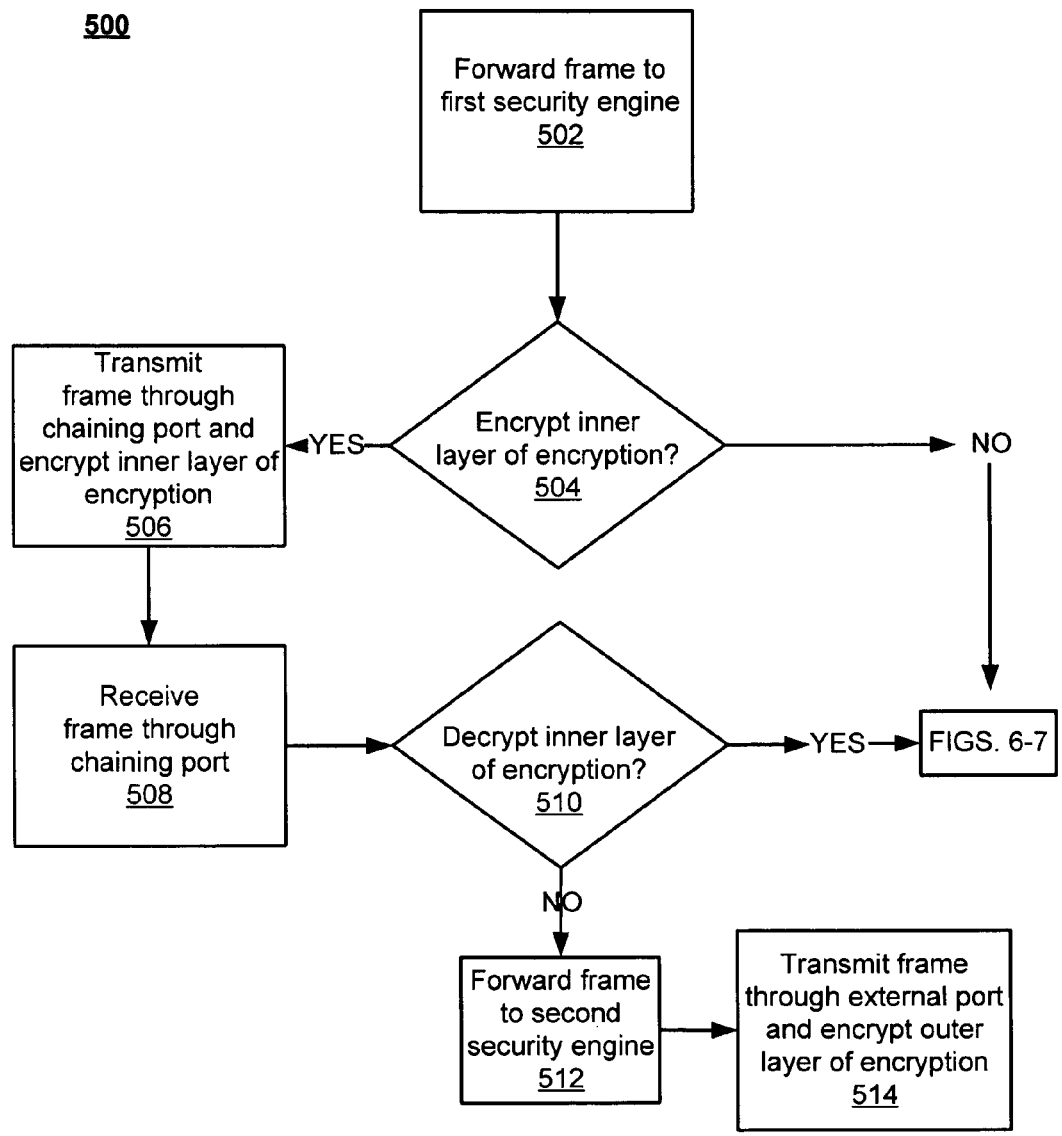
FIG. 5 is a flowchart illustrating operations of the network switch of FIG. 1 during the stages of FIG. 4.

FIG. 5 is a flowchart 500 illustrating egress of the frame 110 through the chaining port 104 and the external port 106. In the example shown in FIG. 5, the frame 110a is forwarded to the first security engine 112a (502). After the frame 110a has been forwarded to the first security engine 112a, the first security engine 112a must determine whether to encrypt the inner layer of encryption (504). If the frame 110a was received from the second security engine 112b, then the first security engine 112a would not encrypt the inner layer of encryption (see FIGS. 6-7 for more discussion of this scenario). However, if the frame 110a was received from the switch logic 134, then the first security engine 112a will encrypt the inner layer of encryption and transmit the frame 110 through the chaining port 104 (506). Next, the frame 110b may be received by the first security engine 112a through the chaining port 104 by way of the connection 105 (508). The first security engine 112a then determines whether to process the inner layer of encryption by decrypting the inner layer of encryption (e.g., will check to see whether the non-decryption tag 412 is present) (510). Decryption of the inner layer of encryption is discussed in more detail in the examples of FIGS. 6-7, but in the example of FIG. 5, the first security engine 112a will not decrypt the inner layer of encryption, and will then forward the frame 110c to the second security engine 112b associated with the external port 106 (512). Then, the second security engine 112b will provide the second layer of encryption (e.g., will add the outer security tag 140A) and transmit the frame 110c through the external port 106 (514).

Figure 6:
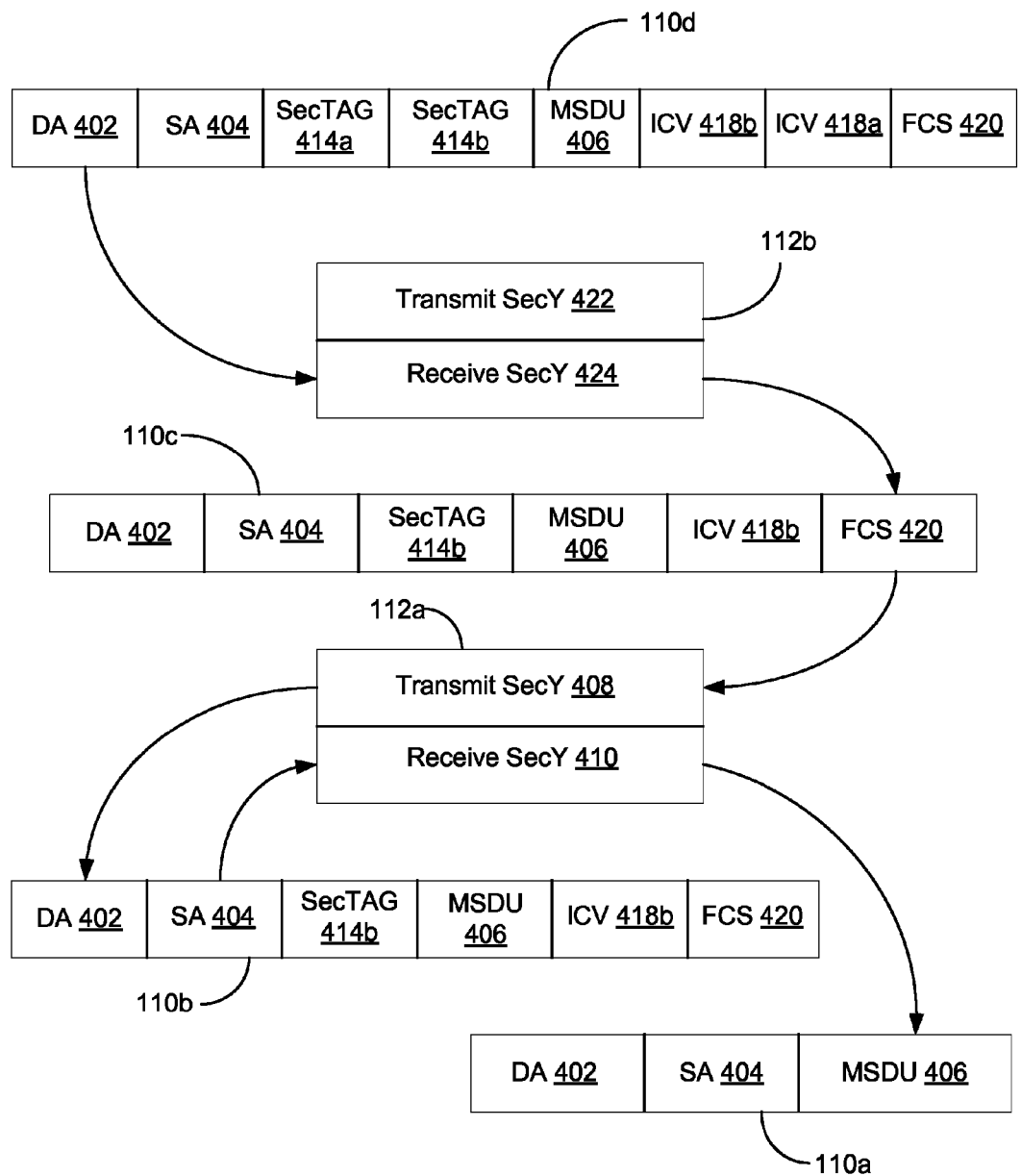
FIG. 6 is a block diagram illustrating stages of a frame of data entering the network switch of FIG. 1.

FIG. 6 is a block diagram illustrating stages of the frame 110 as it ingresses through the external port 106 and the chaining port 104. As in FIG. 4, the example embodiment shown in FIG. 6 utilizes the MACSec Security Protocol (MACSec). In the example shown in FIG. 4, the second security engine 112b receives the frame 110d after having been processed in accordance with the example shown in FIG. 4. Thus, the frame 110d received by second security engine 112b through the external port 106 includes the destination address 402, the source address 404, the inner SecTAG 414b, the outer SecTAG 414a, the user data 406, the inner integrity check value 418b, the outer integrity check value 418a, and the frame check sequence 420.

As the frame 110d is received by the second security engine 112b through the external port 106, the second security engine utilizes the receive SecY 424 to process the outer layer of encryption, including decrypting the outer layer of encryption, validating the frame 110d by calculating an expected integrity check value and comparing the expected integrity check value to the outer integrity check value 418a, extracting and decoding the outer SecTAG 414a from the frame 110d, and removing the outer integrity check value 418a from the frame 110d. At this point, the frame 110c includes a destination address 402, a source address 404, an inner SecTAG 414b, a user data 406, an inner integrity check value 418b, and a frame check sequence 420. The second security engine 112b then forwards the frame 110c to the first security engine 112a in accordance with the control logic 114.

Upon receipt of the frame 110c from the second security engine 112b, the first security engine 112a utilizes the transmit SecY 408 to transmit the frame 110c through the chaining port 104 without performing inner processing or inner encryption, in accordance with the control logic 114. The chaining port 104 may, for example, utilize the external loopback function described above. Because the first security engine 112a did not perform inner processing on the frame 110c upon transmitting the frame, the frame 110b that is received by the receive SecY 410 of the first security engine 112a should be identical to the frame 110c transmitted by the transmit SecY, that is, it should include the destination address 402, the source address 404, the inner SecTAG 414b, the user data 406, the inner integrity check value 418b, and the frame check sequence 420.

In the example of FIG. 6, it may be seen that the frame 110c does not include a specialized marker or identifier to signify to the transmit SecY 408 that inner processing (inner encryption) is not necessary. Rather, it is assumed for this example that the receive SecY 424 is configured to forward the frame 110c by default to the transmit SecY 408, which may be operable to recognize the inner SecTag 414bas an indicator not to apply encryption to the frame 110c. In other example, implementations, however, a non-encryption tag may be provided by the Receive SecY 424 to explicitly mark the frame 110c as a double-layer protected frame. Then, the transmit SecY 408 may use this non-encryption tag to differentiate between classes (e.g., double-layer security or single-layer security) of data traffic, and may remove the non-encryption tag prior to transmission over the connection 105.

Upon receipt of the frame 110b through the chaining port 104, the receive SecY 410 of the first security engine may perform an inner processing on the frame 110b, including decrypting the inner layer of encryption as determined by a flag(s) of the inner SecTAG 414b and configuration settings of the receive SecY 410, validating the frame 110b by calculating an expected integrity check value and comparing the expected integrity check value with the inner integrity check value 418b, removing the inner SecTAG 414b, removing the inner integrity check value 418b, and comparing a computed cyclic redundancy code with the frame check sequence 420. The frame 110a then includes the destination address 402, the source address 404, and the user data 406.

Figure 7:
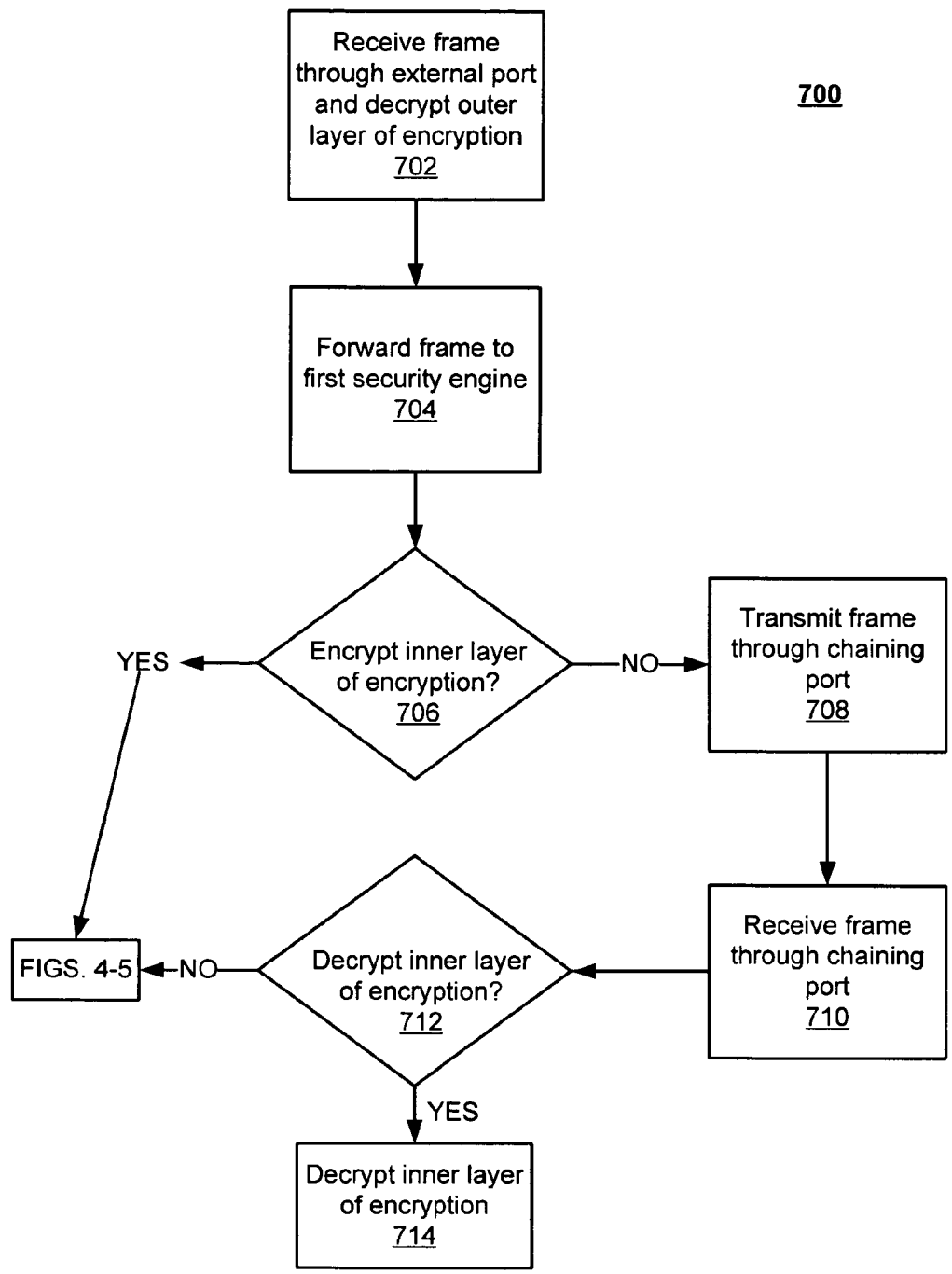
FIG. 7 is a flowchart illustrating operations of the network switch of FIG. 1 during the stages of FIG. 6.

FIG. 7 is a flowchart 700 illustrating ingress of the frame 110 through the external port 106 and the chaining port 104.

In the example shown in FIG. 7, the frame 110 is received by the second security engine 112b through the external port 106, and the second security engine 112b decrypts the outer layer of encryption (702). The second security engine 112b then forwards the frame 110 to the first security engine 112a in accordance with the control logic 114 and/or by default (704). The first security engine 112a must then determine whether to perform inner processing on the frame 110, such as encrypting the inner layer of encryption (706) (instances in which the inner security layer is encrypted are discussed above with regard to FIGS. 4-5). In FIG. 7, and in accordance with the control logic 114, the first security engine 112a will not encrypt the inner layer of encryption, e.g., because the frame 110 was received from the second security engine 112b. The first security engine 112a will then transmit the frame 110 through the chaining port 104 (708) without encrypting the inner layer of encryption. The first security engine 112a will then receive the frame 110 through the chaining port 104 (710), such as by the chaining port 104 executing the external loopback function. The first security engine 112a must then determine whether to perform inner processing on the frame 110, such as decrypting the inner layer of encryption (712) (implementations in which the inner layer of encryption is not decrypted are described above with respect to FIGS. 4-5). In FIG. 7, because the frame 110 does not include a non-decryption tag 412, the first security engine 112a will then perform inner processing on the frame 110 such as decrypting the inner layer of encryption (714).

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A network chip comprising:
a chaining port configured to perform an external loopback function including a first security engine transmitting a frame of data through the chaining port and receiving the frame of data back through the chaining port;
an external port configured to send and receive the frame of data to and from at least one provider device, the at least one provider device being external from the network chip;
the first security engine associated with the chaining port, the first security engine being configured to execute a first addition operation to add an inner encryption layer to the frame in conjunction with the first security engine transmitting the frame of data and configured to perform a first removal operation to remove the inner encryption layer in conjunction with the first security engine receiving the frame of data;
a second security engine associated with the external port, coupled to the first security engine, the second security engine being configured to perform a second addition operation to add an outer encryption layer to the frame when the external port sends the frame of data to the at least one provider device and configured to perform a second removal operation to remove the outer encryption layer when the external port receives the frame of data, wherein the first and second security engines are configured to sequentially operate on the frame of data to add or remove the inner encryption layer and the outer encryption layer; and
control logic configured to cause the first security engine to:
perform the first addition operation but not the first removal operation if the frame of data is to be transmitted by the external port to the at least one provider device; and
perform the first removal operation but not the first addition operation if the frame of data was received by the external port from the at least one provider device.

2. The network chip of claim 1 wherein the inner encryption layer includes a MACSec layer.

3. The network chip of claim 1 wherein the first security engine is configured to execute the first addition operation by applying to the frame of data an inner cryptographic key associated with an inner security tag of the frame of data.

4. The network chip of claim 1, wherein the control logic is further configured to route the frame of data between the first security engine and the second security engine.

5. The network chip of claim 1 wherein:
the first security engine is configured to execute the first addition operation including adding an inner security tag to the frame of data; and
the second security engine is configured to execute the second addition operation including adding an outer security tag to the frame of data when the frame of data is transmitted from the network chip.

6. The network chip of claim 1 wherein the second security engine is configured to execute the second removal operation including removing an outer security tag from the frame of data and the first security engine is configured to execute the first removal operation including removing an inner security tag from the frame of data when the frame of data is received by the network chip.

7. The network chip of claim 1, wherein:
the outer layer of encryption is associated with the provider device, and
the inner layer of encryption is associated with a customer device, the customer device being at least one hop further away from the network chip than the provider device.

8. The network chip of claim 1, wherein:
the outer layer of encryption is associated with at least one cryptographic key held by the provider device; and
the inner layer of encryption is associated with at least one cryptographic key held by a customer device, the customer device being at least one hop further away from the network chip than the provider device.

9. The network chip of claim 1, wherein:
the first security engine includes a first transmit module configured to execute the first addition operation and a first receive module configured to execute the first removal operation; and
the second security engine includes a second transmit module configured to execute the second addition operation and a second receive module configured to execute the second removal operation.

10. A network device comprising:
a chaining port configured to perform an external loopback function including a first security engine transmitting a frame of data through the chaining port and receiving the frame of data back through the chaining port;
an external port configured to send and receive the frame of data to and from at least one provider device, the at least one provider device being external from the network device;
the first security engine associated with the chaining port, the first security engine being configured to process an inner layer of encryption on the frame of data; and a second security engine, associated with the external port and coupled to the first security engine, and configured to process a different outer layer of encryption on the frame of data;

wherein the first security engine is configured to add the inner layer of encryption in conjunction with the first security engine transmitting the frame of data and the second security engine is configured to add the different outer layer of encryption when the external port sends the frame of data from the network device to the at least one provider device; and wherein the second security engine is configured to remove the different outer layer of encryption when the external port receives the frame of data from the at least one provider device and the first security engine is configured to remove the inner layer of encryption in conjunction with the first security engine receiving the frame of data.

11. The network device of claim 10 wherein the outer layer of encryption includes an outer MACSec layer, and the inner layer of encryption includes an inner MACSec layer.

* * * * *